US008092676B2

(12) United States Patent
Dickinson et al.

(10) Patent No.: US 8,092,676 B2
(45) Date of Patent: *Jan. 10, 2012

(54) TANK FOR A SYSTEM THAT OUTPUTS LIQUID AT A USER-DEFINED CONSTANT TEMPERATURE

(75) Inventors: Randall Douglas Dickinson, Kennebunk, ME (US); Patrick Joseph Horan, Dover, NH (US); Nathan Norman Lang, Rochester, NH (US)

(73) Assignee: Thermo Fisher Scientific Inc., Waltham, MA (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/330,040

(22) Filed: Jan. 11, 2006

(65) Prior Publication Data

US 2007/0158250 A1 Jul. 12, 2007

(51) Int. Cl.
*B01D 35/18* (2006.01)
*C02F 1/02* (2006.01)
*F28F 13/12* (2006.01)
*F28F 19/00* (2006.01)

(52) U.S. Cl. ............... 210/175; 210/483; 210/497.01; 210/172.6; 210/244; 165/119

(58) Field of Classification Search .................. 165/119, 165/80.1, 75, 11.1, DIG. 4, DIG. 342, DIG. 348, 165/DIG. 351; 210/184, 167.32, 167.02, 210/175; 141/326, 331, 332, 334, 340, 344; 220/592.01, 495, 301, 495.08, 529, 532

See application file for complete search history.

(56) References Cited

U.S. PATENT DOCUMENTS

| 2,052,344 | A | * | 8/1936 | Edelmann | ............... 222/155 |
| 2,995,647 | A | | 8/1961 | Bernard | |
| 3,295,689 | A | | 1/1967 | Arvanitakis | |
| 3,409,218 | A | * | 11/1968 | Moyer | ............... 237/12.3 B |
| 3,498,278 | A | | 3/1970 | Lee | |
| 3,659,458 | A | | 5/1972 | Bice et al. | |
| 3,847,814 | A | | 11/1974 | Adachi | |
| 3,959,137 | A | | 5/1976 | Kirsgalvis | |
| 3,992,894 | A | | 11/1976 | Antonette et al. | |
| 4,112,984 | A | | 9/1978 | Guglia et al. | |
| 4,133,769 | A | | 1/1979 | Morgan | |
| 4,291,192 | A | | 9/1981 | Eccleston | |
| 4,343,353 | A | * | 8/1982 | Tsopelas | ............... 165/119 |

(Continued)

FOREIGN PATENT DOCUMENTS

CA 2231511 A1 5/1997

(Continued)

*Primary Examiner* — Krishnan S Menon
*Assistant Examiner* — Katherine Zalasky
(74) *Attorney, Agent, or Firm* — Kriegsman & Kriegsman

(57) ABSTRACT

A tank for use in a system that outputs a liquid at a user defined constant temperature in order to regulate the temperature of a piece of equipment includes a body of material defining a chamber for receiving and storing the liquid. The top wall has a fill port and one of the other walls includes an outlet port. An auxiliary port and fluid return port are also included. The body further includes a well, sized to accommodate a deionizer cartridge, extending down into the chamber from an opening in top wall that can be removed. A flow velocity reducer is disposed in the auxiliary port for reducing the velocity of the liquid entering the auxiliary port from the return fluid port and then passing into the fill port so that the liquid does not spray or splash onto the walls of the fill port.

2 Claims, 17 Drawing Sheets

U.S. PATENT DOCUMENTS

| | | | |
|---|---|---|---|
| 4,403,692 | A | 9/1983 | Pollaco |
| 4,471,631 | A | 9/1984 | Anstey et al. |
| 4,571,987 | A | 2/1986 | Horner |
| 4,600,125 | A | 7/1986 | Maynard |
| 4,628,960 | A | 12/1986 | Brickell et al. |
| 4,633,676 | A | 1/1987 | Ditell |
| 4,638,928 | A | 1/1987 | Webster |
| 4,640,185 | A | 2/1987 | Joyner |
| 4,657,068 | A | 4/1987 | Pelz |
| 4,703,867 | A | 11/1987 | Schoenhard |
| 4,723,577 | A | 2/1988 | Wusterbarth |
| 4,738,228 | A | 4/1988 | Jenz et al. |
| 4,787,445 | A | 11/1988 | Howcroft |
| 4,802,338 | A | 2/1989 | Oswalt et al. |
| 4,987,777 | A | 1/1991 | Bouret et al. |
| 5,005,379 | A | 4/1991 | Brown |
| 5,075,004 | A | 12/1991 | Gershenson et al. |
| 5,076,068 | A | 12/1991 | Mikhail |
| 5,101,869 | A | 4/1992 | Myers |
| 5,121,788 | A | 6/1992 | Carollo |
| 5,172,832 | A | 12/1992 | Rodriquez et al. |
| 5,316,059 | A | 5/1994 | Lahnan et al. |
| 5,402,835 | A | 4/1995 | Middleton |
| 5,408,046 | A | 4/1995 | Vandeventer |
| 5,421,381 | A | 6/1995 | Ewald |
| 5,445,196 | A | 8/1995 | Tyree |
| 5,484,336 | A | 1/1996 | McConnell |
| 5,562,824 | A * | 10/1996 | Magnusson .................... 210/266 |
| 5,776,339 | A * | 7/1998 | Ha et al. ..................... 210/257.2 |
| 5,799,499 | A | 9/1998 | Yano et al. |
| 5,941,300 | A | 8/1999 | Colling et al. |
| 6,003,595 | A | 12/1999 | Watanabe |
| 6,112,541 | A | 9/2000 | Greene |
| 6,136,192 | A | 10/2000 | Booth et al. |
| 6,450,219 | B1 | 9/2002 | Ingram |
| 6,539,735 | B1 | 4/2003 | Schmidt |
| 6,615,608 | B1 | 9/2003 | Telez et al. |
| 6,708,522 | B2 | 3/2004 | Yamazaki et al. |
| 6,708,653 | B2 | 3/2004 | Lefrancois et al. |
| 6,733,669 | B1 * | 5/2004 | Crick ........................... 210/244 |
| 6,769,516 | B2 | 8/2004 | Carlson |
| 6,772,794 | B2 | 8/2004 | Seguin |
| 6,908,283 | B2 * | 6/2005 | Soofer et al. ............... 415/215.1 |
| 2002/0040585 | A1 | 4/2002 | Chaney |
| 2002/0053366 | A1 | 5/2002 | Clarke, III et al. |
| 2004/0074556 | A1 | 4/2004 | O'Connell |
| 2004/0261902 | A1 | 12/2004 | Eddins et al. |
| 2005/0028550 | A1 | 2/2005 | Crettet, IV |
| 2005/0067050 | A1 | 3/2005 | Pacitto, Jr. et al. |
| 2005/0072172 | A1 | 4/2005 | Sakaguchi et al. |
| 2006/0091062 | A1 | 5/2006 | Akahori et al. |

FOREIGN PATENT DOCUMENTS

| | | |
|---|---|---|
| EP | 1505273 A2 | 4/2004 |
| JP | 041245572 A | 4/1992 |
| JP | 09075644 A | 3/1997 |
| WO | WO 96/20379 A1 | 7/1996 |
| WO | WO 02/088611 A1 | 11/2002 |

* cited by examiner

TANK FOR A SYSTEM THAT OUTPUTS LIQUID AT A USER-DEFINED CONSTANT TEMPERATURE

BACKGROUND OF THE INVENTION

The present invention relates generally to systems that output a liquid at a user-defined constant temperature and more particularly to a tank for use in a system that outputs a liquid at a user-defined constant temperature, the tank being designed to receive and store a supply of the liquid which is in turn used by the system to control the temperature of a piece of equipment.

Systems that output a liquid, such as water, at a user-defined constant temperature to regulate the temperature of a piece of equipment, such as a welding machine, laser or molding machine, are well known in the art.

Systems of the type as described above which are used primarily to cool down the temperature of a piece of equipment as opposed to heat up the temperature of the piece of equipment are commonly referred to in the art as chillers. An example of a chiller may be found in U.S. Pat. No. 4,802,338 to P. D. Oswalt etc.

Referring now to FIG. 1, there is shown a simplified block diagram of a conventional chiller 11 which is connected to a particular piece of equipment 13 by a continuous fluid path 15 through which coolant circulates in one direction. As will be described in detail below, chiller 11 is responsible for both reducing the temperature of the coolant and in turn pumping the low temperature coolant through the piece of equipment 13. Based on well-known thermal exchange principles, the low-temperature coolant provided by chiller 11 thus serves to reduce the temperature of piece of equipment 13. However, as a result of the thermal exchange process, the temperature of the coolant rises as it passes through piece of equipment 13. Accordingly, the higher temperature coolant is directed by fluid path 15 back into chiller 11 where it is subsequently reduced in temperature and thereby available for re-circulation through device 13. In this manner, a continuous coolant cycle is established between chiller 11 and device 13.

As can be seen, chiller 11 is provided with a refrigeration system 17 for reducing the temperature of the supply of coolant which returns to chiller 11 from device 13. Chiller 11 additionally includes a tank 19 which serves as a means for (i) receiving and storing coolant, (ii) collecting the return supply of coolant which has been reduced in temperature by refrigeration system 17 and (iii) introducing additional coolant into fluid path 15 as deemed necessary (e.g., as a result of coolant evaporation). Furthermore, chiller 11 includes a pump 21 which is responsible for drawing a supply of chilled coolant from tank 19 and in turn for circulating said coolant through fluid path 15 (i.e., delivering said chilled coolant to device 13). In some chillers 11, a portion of the liquid from pump 21 is not sent to piece of equipment 13, but rather is sent back to tank 19 after it passes through a deionizer 22. A temperature sensor 23 is preferably provided in chiller 11 at a point along fluid path 15 as the chilled coolant exits chiller 11 for coolant temperature monitoring purposes.

As noted above, refrigeration system 19 serves to reduce the temperature of the supply of coolant which returns to chiller 11 from device 13. Refrigeration system 19 includes a compressor 25, a condenser 27, an expansion device 29 and a heat exchanger 31 that are interconnected by a continuous refrigerant fluid path 33 through which a supply of refrigerant circulates in one direction. In use, compressor 25 draws low pressure, low temperature refrigerant gas (e.g., gas having a temperature of approximately 60° F. and a pressure of approximately 35 psi) through a suction line and compresses the gas so as to yield a high pressure, high temperature refrigerant gas (e.g., gas having a temperature of approximately 170° F. and a pressure of approximately 120 psi). Condenser 27 cools and liquefies the high pressure, high refrigerant gas without modifying its pressure so as to yield a high pressure liquid refrigerant (e.g., liquid having a temperature of 100° F. and a pressure of approximately 120 psi). Expansion device 29 expands the high pressure liquid refrigerant so as to yield a low pressure, low temperature, primarily liquid-based refrigerant (e.g., liquid having a temperature of approximately 30° F. and a pressure of approximately 35 psi).

As can be seen in FIG. 1, both coolant fluid path 15 and refrigerant fluid path 33 pass through heat exchanger 31. Accordingly, the low temperature liquid refrigerant which passes through fluid path 33 reduces the temperature of the coolant circulating through fluid path 15. However, the above-described thermal transfer causes the low temperature liquid refrigerant in fluid path 33 to evaporate in heat exchanger 31. The evaporated refrigerant is discharged from heat exchanger 31 as a low pressure gaseous refrigerant which, in turn, is drawn into the suction line of compressor 25, thereby creating a continuous refrigerant cycle.

Traditionally, a tank for use in a system that outputs a liquid at a user-defined constant temperature (e.g., chiller tank 19 in prior art FIG. 1) includes a plurality of input ports through which the liquid is introduced into the tank and a single discharge port through which liquid is discharged from the tank, all of said ports being separate from one another and in fluid communication with the chamber inside the tank.

Commonly, the thermally controllable liquid is input into the tank through one or more of the following input ports, namely: (1) a return port which is designed to receive the liquid that has already been used to regulate the temperature of the particular piece of equipment (e.g., the re-circulated coolant reduced in temperature by heat exchanger 31 in FIG. 1); (2) a manual fill port which is designed to receive new, unused liquid by manual means (e.g., through a pouring process); and (3) an auxiliary port which is designed to receive new, unused liquid from a source by automated means or return liquid emitted by pump 21 but which has not passed through piece of equipment 13.

It should be noted that a system that outputs a liquid at a user-defined constant temperature and includes a tank for receiving and storing liquid is also often provided with one or more of the following optional devices in addition to the deionizer noted above which is disposed outside of the tank for deionizing the liquid contained therein; (1) a heater extending into the tank for heating the liquid contained therein (i.e., when the system requires the temperature of liquid to be raised); (2) an immersion pump extending into the tank for withdrawing liquid contained therein (i.e., as a replacement for external pump 21); (3) two or more filters disposed inside the tank at either the fill port, the discharge port or the return port and (4) a sight gauge coupled to the tank through fittings for providing a visual indication of the level of thermally controllable liquid contained therein.

Although well known and widely used in the art, tanks of the type described above have been found to experience at least some of the following shortcomings.

As a first shortcoming, as noted above, tanks of the type as described above typically mount the deionizer outside of the tank, the deionizer being coupled to the tank by means of one or more hoses or pipes. Although functionally satisfactory, this arrangement substantially increases the overall dimensions of the system, which is highly undesirable.

As a second shortcoming, tanks of the type described above are not universally constructed to receive any one of either a deionizer, or a heater or an immersion pump. Rather, a unique tank is typically constructed for use in conjunction with each of the above-identified devices, thereby increasing manufacturing costs (i.e. to fabricate three differently constructed tanks), which is highly undesirable.

As a third shortcoming, tanks of the type described above are not typically provided with filtration means at the return port. As a result, liquid introduced through the return port may introduce unwanted particles of material into the interior of the tank. As a result, certain devices that maybe disposed inside the tank (e.g., a heater, immersion pump, etc.) may be exposed to the unwanted particles of material, which is highly undesirable.

As a fourth shortcoming, tanks of the type described above typically mount a sight gauge (also commonly referred to as a sight tube) on the outer surface of the tank housing, wherein the sight gauge is coupled to the interior of the tank through fittings provided in a wall of the tank and on the sight gauge itself. As can be appreciated, it has been found that these fittings represent potential leak points, which is highly undesirable.

As a fifth shortcoming, all of the various components for a system that outputs a liquid at a user-defined constant temperature are typically mounted within an outer protective shell (i.e. system housing) so as to render the system compact and unitary in nature, the outer shell often including a plurality of metal or plastic panels secured together in a box-type configuration. In most conventional systems, the manual fill port of the tank protrudes up through a small circular opening provided in one panel of the outer protective shell (e.g., the top panel). Because this construction renders the interior chamber externally accessible through manual fill port (and thereby susceptible to contaminants), it is to be understood that the manual fill port is typically sealed off with a cap which can be easily removed when needed in order to pour fluid into the chamber. The above-described design introduces two notable disadvantages: (1) the particular shape of the manual fill port is not conducive to pouring liquid therethrough without substantial splashing, and (2) a small annular space is created between the manual fill port of the tank and the panel of the outer protective shell, said space serving as a means by which moisture (e.g., splashed coolant) may enter into the system and potentially damage selected components contained therein. As a result, an enlarged removable funnel is often inserted into the manual fill port during the liquid pouring process. However, as can be appreciated, the use of a removable funnel in this manner has been found to be not entirely satisfactory.

SUMMARY OF THE INVENTION

It is an object of the present invention to provide a new and improved tank for a system that outputs a liquid at a user-defined constant temperature for use in regulating the temperature of a piece of equipment.

It is another object of the present invention to provide a tank as described above which has a minimum number of parts.

It is yet another object of the present invention to provide a tank of the type as described above which is universally constructed to hold either a deionizer, a heater or an immersion pump.

It is still another object of the present invention to provide a tank of the type as described above which includes a single filter which filters liquids entering the tank through all of its input ports.

It is yet still another object of the present invention to provide a tank of the type as described above which includes a sight gauge which is attached to the tank in such a manner so as to render the tank less susceptible to leakage.

It is yet a further object of the present invention to provide a tank of the type as described above which is inexpensive to manufacture and which is easy to use.

It is still a further object of this invention to provide a tank of the type as described above in which coolant can easily and efficiently poured into the tank through the fill port.

Accordingly, as one feature of the present invention, there is provided a tank for use in a system that outputs a liquid at a user-defined constant temperature in order to control the temperature of a piece of equipment, said tank comprising a body of material sized and shaped to define a chamber for receiving and holding a supply of the liquid, the chamber having an inlet port and outlet port and an opening, the chamber being sized and shaped to accommodate either a heater or an immersion pump, and a removable well extending down into the chamber through the opening, the well being sized and shaped to accommodate a deionizer cartridge, wherein, when the well is removed from the body of material either the heater or the immersion pump can be disposed inside chamber.

As another feature of the present invention, there is provided a tank for use in a system that outputs a liquid at a user defined constant temperature in order to control the temperature of a piece of equipment, said tank comprising a body of material having a bottom wall, a top wall and at least one sidewall which together define a chamber for holding the liquid, the chamber being shaped to define a fill port for manually pouring new liquid into the interior chamber, an auxiliary port which can be used either for automatically adding new liquid into the chamber or returning liquid discharged through the chamber but not passed through the piece of equipment, a return port for returning liquid passed through the piece of equipment back in the chamber, and an outlet port for discharging liquid from the interior chamber, and a single filter disposed within the chamber at a location for filtering fluid entering the chamber from the fill port, the automatic refill port and the return port.

As another feature of the present invention, there is provided a tank for use in a system that outputs a liquid at a user defined constant temperature in order to control the temperature of a piece of equipment, said tank comprising a body of material having a top wall and a plurality of other walls which collectively define a chamber for receiving and storing a supply of the liquid, the top wall having a fill port for introducing liquid into the chamber, one of the other walls having an outlet port for discharging liquid stored in the chamber, and a sight gauge disposed partially inside the chamber and partially imbedded into the body of material for providing a visual indication of the level of the liquid in the chamber, the sight gauge comprising a transparent tube having an upper end in the fill port, a first intermediate portion below the upper end and imbedded on the body of material, a second intermediate portion disposed below the first intermediate portion outside the body of material and being oriented vertically and a lower end below the second intermediate portion and embedded in the body of material and in communication with the chamber through an opening around the bottom of the chamber, wherein the level of the fluid in the chamber will be about the same as the height of the level in the sight gauge.

As another feature of the present invention, there is provided a tank for use in a system that outputs a liquid at a user defined constant temperature in order to control the temperature of a piece of equipment, said tank comprising a body of material having a plurality of walls which together define a chamber for receiving and storing a supply of the liquid, the body of material being shaped to define a fill port for pouring new liquid into the chamber, an auxiliary port for use in either automatically adding new liquid into the interior chamber or returning liquid discharged by the chamber but not passed through the piece of equipment, a return liquid port for returning liquid from the equipment back into the chamber through the fill port; and an outlet port for discharging liquid from the chamber, and a flow velocity reducer for lowering the velocity of the liquid entering the chamber from the return liquid port.

As another feature of the present invention, there is provided a tank for use in a system that outputs a liquid at a user defined constant temperature in order to control the temperature of a piece of equipment, said tank comprising a body of material shaped to define a chamber for retaining a supply of the liquid, the chamber having a fill port, and a cover assembly sized and shaped to extend over and cover the fill port, the cover assembly comprising a funnel shaped cover removably mounted on the fill port, and a sealing cap removably mounted on the cover.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Figure 2:
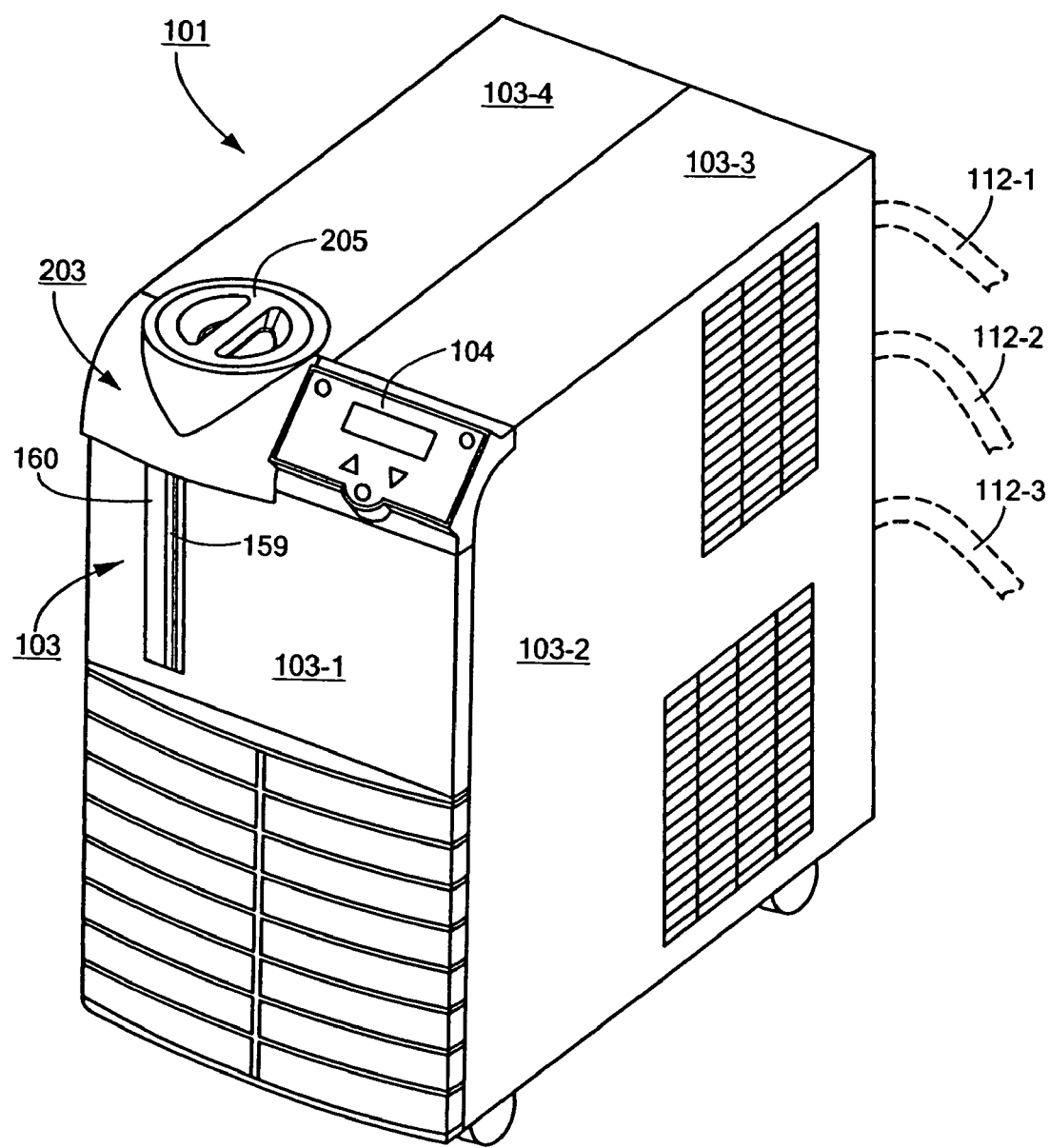
FIG. 2 is a perspective view from the top front of a system for outputting a liquid at a user-defined constant temperature according to this invention.

Referring now to the drawings, there is shown in FIG. 2 a system (i.e. apparatus) constructed according to the teachings of the present invention, the system being identified generally by reference numeral 101. System 101 is designed to output a liquid (e.g., water, an ethylene glycol and water mixture, a propylene glycol and water mixture, silicon oil, etc.) at a user-defined constant temperature in order to regulate the operating temperature of an intended piece of equipment (not shown), such as a welding machine, a laser or a molding machine.

As will be described in detail below, system 101 includes a housing 103. Housing 103 includes a front panel 103-1, a side panel 103-2 and a pair of top panels 103-3 and 103-4. A display 104 for displaying information such as the date and temperature of the fluid discharged by the system is mounted on housing 103. Disposed inside housing 103 are a plurality of components which make up system 101. The components include a tank 111, which is shown, for example, in FIG. 3, which serves as a place for introducing liquid into system 101 and a place for storing liquid for thermal expansion, the thermally regulated liquid in turn being circulated through the intended piece of equipment in order to raise or lower its operating temperature as deemed necessary. It is to be understood that tank 111 is provided with a number of novel design features to be described in detail below, these features serving as the principal novel aspects of the present invention. System 101 further includes two inlet hoses 112-1, 112-2 and one outlet hose 112-3. Inlet hoses 112-1 and 112-2 may be connected to two inlet ports of tank 111, while hose 112-3 may be connected to a discharge port of tank 111.

Referring now to FIGS. 3-7, tank 111 comprises a one-piece body of rigid material 113 which is preferably constructed out of polyethylene. However, it is to be understood that body of material 113 is not limited to being constructed out of polyethylene. Rather, body of material 113 could be constructed out of alternative types of plastics, such as Kynar®, or metals without departing from the spirit of the present invention.

Preferably, body of material 113 is formed using rotational molding techniques. Specifically, rotational molding is a low pressure molding process which utilizes individual plastic pellets which are, in turn, heated and spun within a mold to form the finished product. However, body of material 113 could, if desired be made of other techniques, such as by casting.

Body of material 113 comprises a two level top wall 114-1 and 114-2, a bottom wall 115, a front wall 116, a back wall 117, a left sidewall 118 and a right sidewall 119, which together define a chamber 121. As can be appreciated, chamber 121 is sized and shaped to retain a supply of the thermally controlled liquid which is used by system 101 to regulate the operating temperature of the intended piece of equipment.

Figure 3:
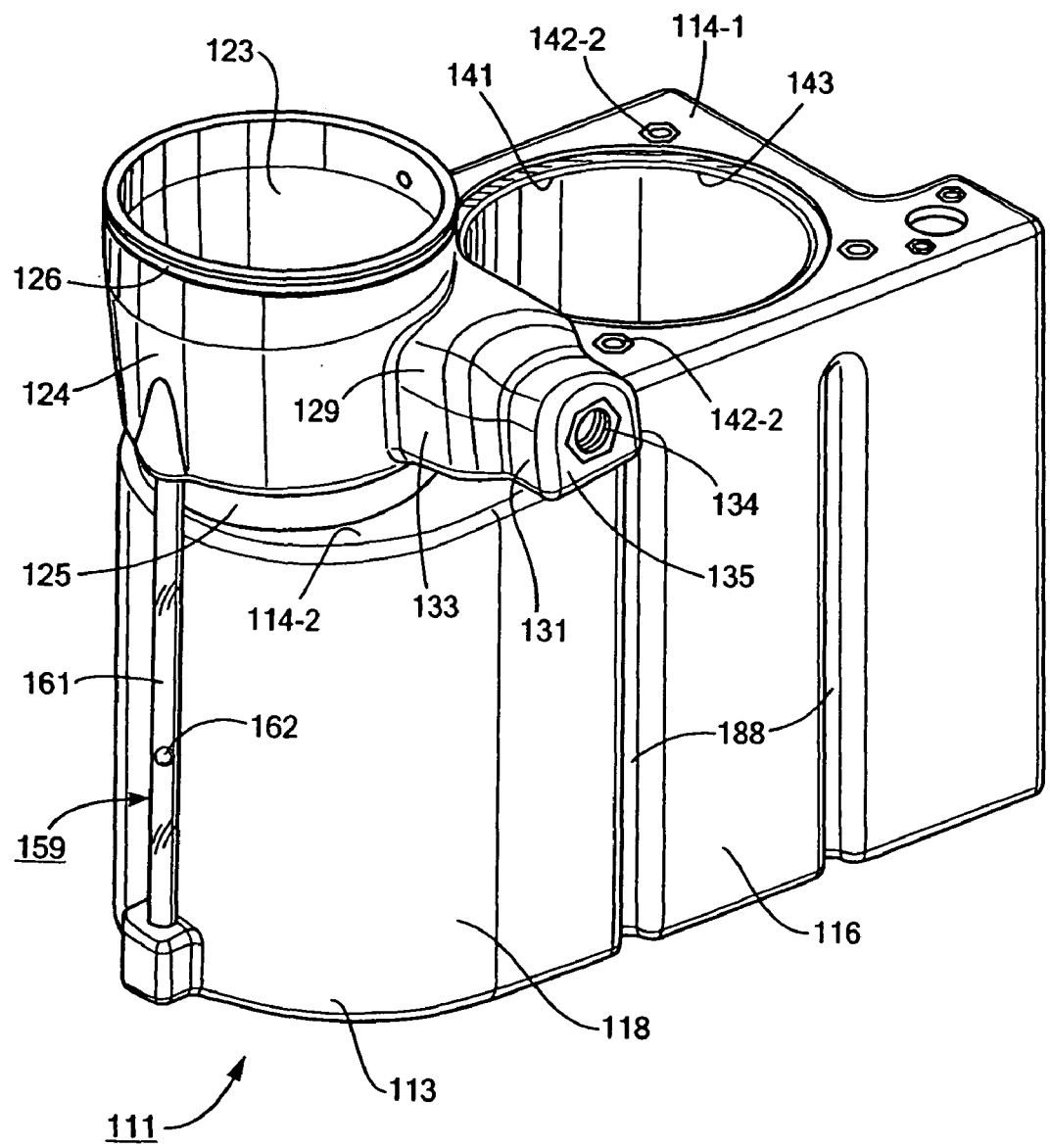
FIG. 3 is a perspective view taken from the front of the tank in the system shown in FIG. 2.
Figure 4:
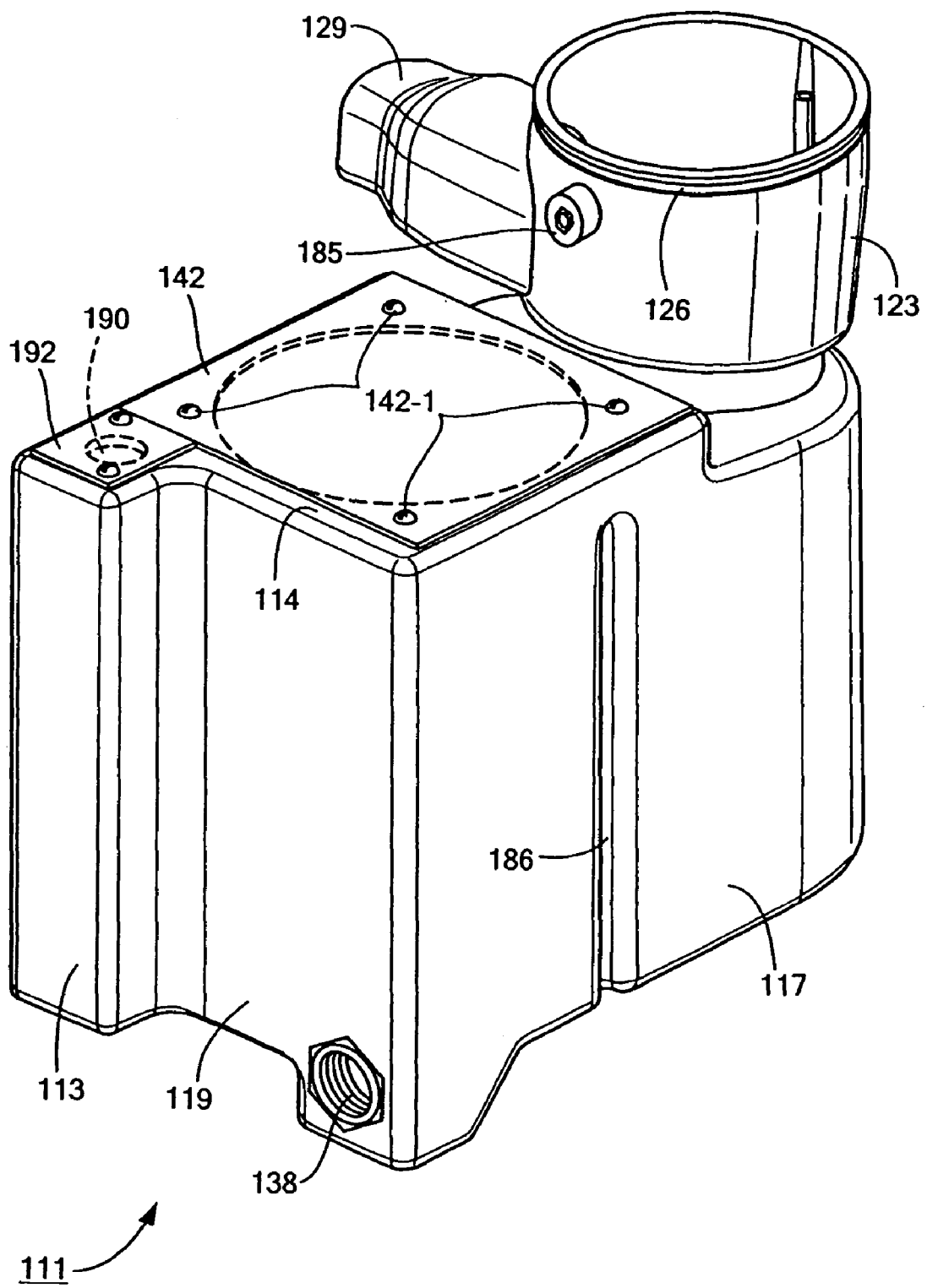
FIG. 4 is a perspective view taken from the rear of the tank in the system shown in FIG. 2; with a cover plate covering the opening in the top of the tank.
Figure 5:
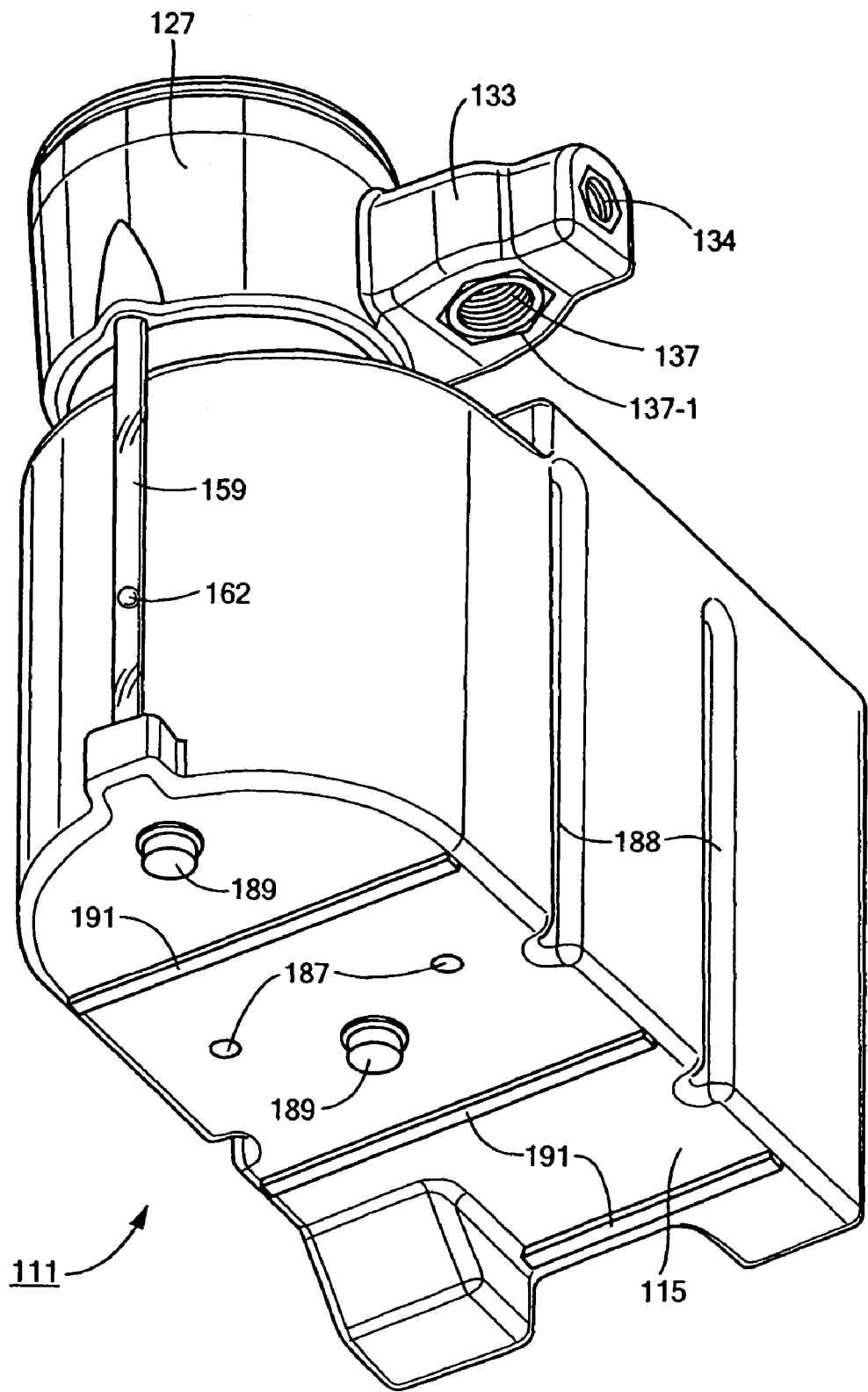
FIG. 5 is a perspective view taken from the bottom of the tank in the system shown in FIG. 2.
Figure 6:
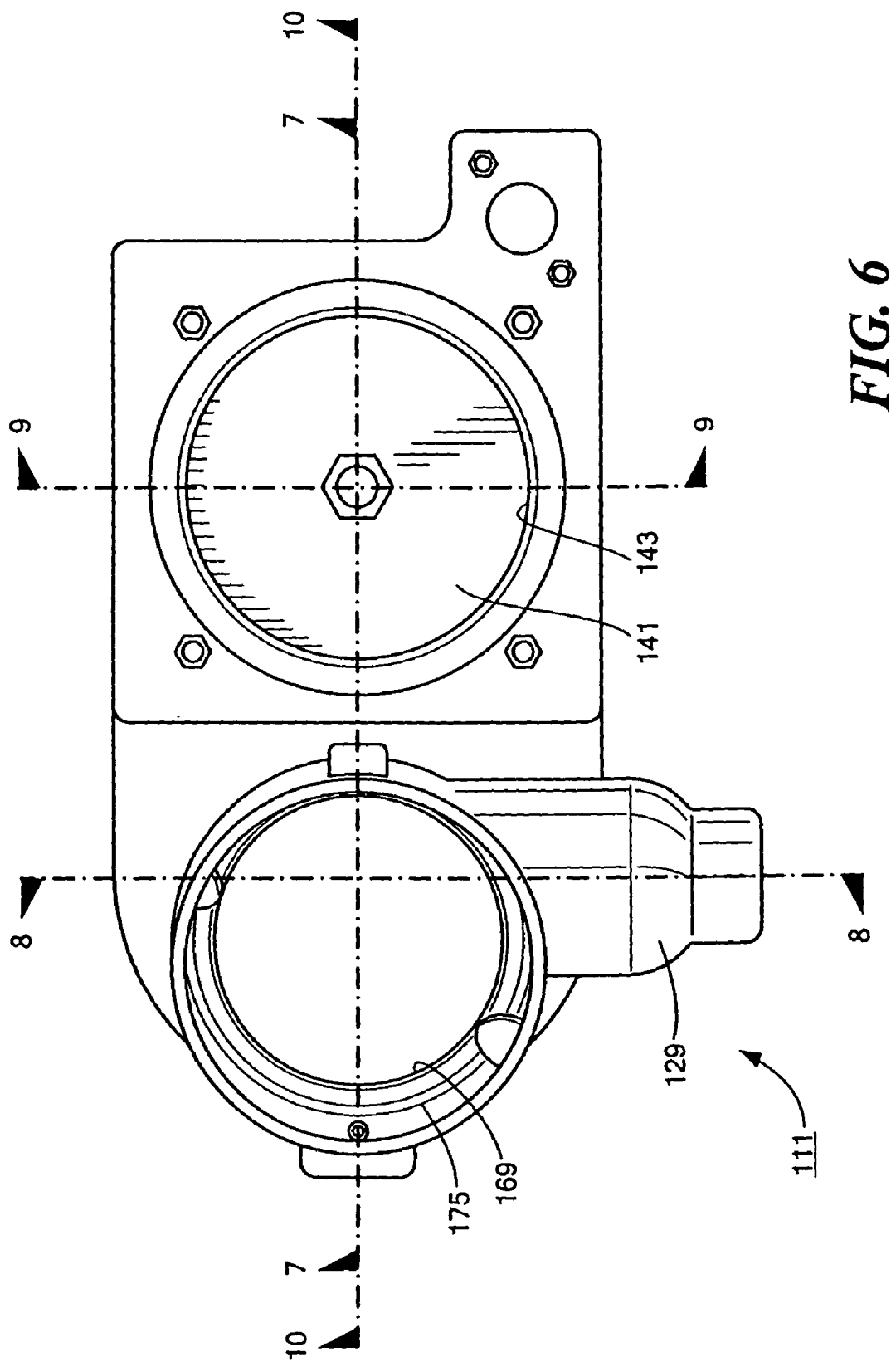
FIG. 6 is a top view of the tank as shown in FIG. 3.

As seen most clearly in FIGS. 3-5, an enlarged manual fill port 123 extends upward from top wall 114-2 of body of material 113 and serves as the means for manually inputting new liquid into chamber 121. Fill port 123 includes a collar portion 124 and a neck portion 125. Collar portion 124 includes a gasket 126.

A snout shaped auxiliary port 129 protrudes orthogonally away from collar portion 124. Snout shaped auxiliary port 129 includes a narrow inlet portion 131 and a widened outlet portion 133, widened outlet portion 133 connecting narrow portion 131 to collar portion 124.

A threaded nut 134 is molded into the free end 135 of inlet portion 131 of auxiliary port 129 to enable connecting auxiliary port 129 to a source of fluid. A return fluid port 137 is formed on the bottom side of widened portion 133 of auxiliary port 129 and serves as the means for inputting fluid returned from the equipment into chamber 121. In addition, a threaded nut 137-1 is molded into the inlet of return fluid port 137 to enable connecting return fluid port 137 to piping or tubing. As can be seen, the cross-sectional diameter of auxiliary port 135 is greater than the cross-sectional diameter of return fluid port 137.

It is to be understood that manual fill port 123, auxiliary port 129 and return fluid port 137 represent all of the input ports for tank 111. Stated another way, ports 123, 129 and 137 represent the only designed means for inputting liquid into interior chamber 121. It should also be noted that tank 111 is constructed such that all the liquid entering chamber 121 through ports 123, 129 and 137 passes through manual fill port 123.

A discharge port 138 is formed on right sidewall 119 of body of material 113 in close proximity to bottom wall 117 for discharging liquid from chamber 121. A threaded nut 139 is molded into discharge port 138 to enable connecting discharge port 138 to appropriate tubing. As can be appreciated, thermally controlled liquid which is input into chamber 121 through any/all of input ports 127, 135 and 137 is discharged from tank 111 through the single discharge port 138.

Auxiliary port 129 is used for either of two purposes, namely, (1) adding fluid into chamber automatically from a source (not shown) or (2) returning fluid discharged through port 138 but which has not passed through the piece of equipment. Inlet hoses 112-1 and 112-2 may be connected to ports 134 and 137 and outlet hose 112-3 may be connected to port 138.

An enlarged circular opening 141 is formed in top wall 115 of body of material 113, spaced from fill port 123. As will be described further in detail below, opening 141 serves among other things as a passageway through which optional devices (e.g., a heater, immersion pump, etc.) may be mounted into chamber 121. Opening 141 may be closed off with a cover plate 142 which is secured to top wall 115 by screws 142-1. Plate 142 may be part of a heater or an immersion pump.

Well

Referring now especially to FIGS. 3, 6, 7 and 9, a well 143 is formed onto top wall 114 of body of material 113 and extends down into chamber 121 through opening 141. As seen most clearly in FIGS. 6 and 7, well 143 includes a cylindrical sidewall 145 and a bottom wall 147 which together define a well cavity 149. As can be seen, bottom wall 147 is spaced from bottom wall 115 of chamber 123.

As can be appreciated, well 143 serves two principal functions.

As a first function, well 143 is sized and shaped to receive and accommodate a deionizer cartridge 153 within well cavity 149, with the output end of deionizer cartridge 153 extending up through opening 141 and the input end screwed into hole 151 in bottom wall 147.

As a second function, well 143 serves to reduce the volume of the fluid which can be stored in chamber 121, which is highly desirable in certain applications.

Figure 9:
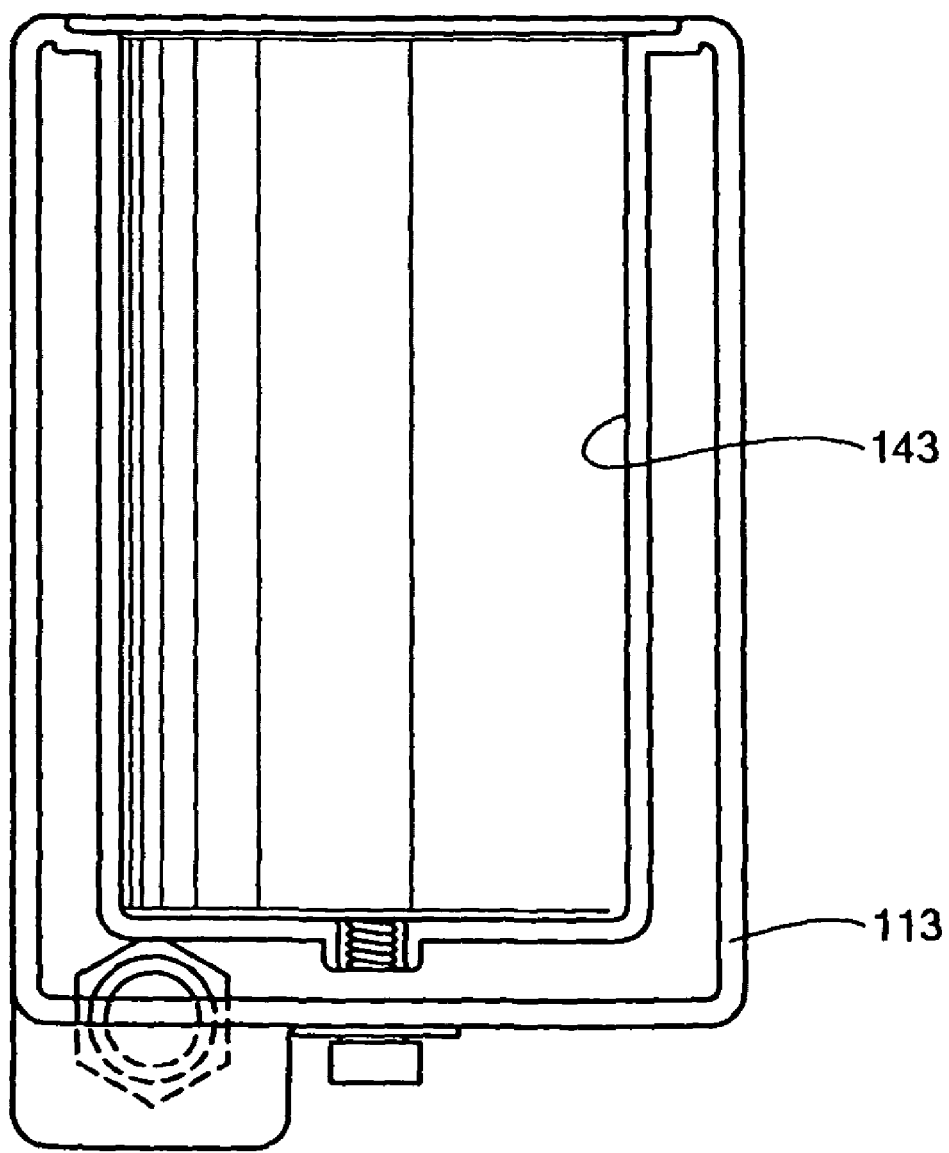
FIG. 9 is a section view of the tank shown in FIG. 7 taken along lines 9-9 in FIG. 6.

Normally, bottom wall 147 of well 137 has no openings as shown in FIG. 9; however, when a deionizer cartridge 153 is to be mounted inside well 143 a small internally threaded hole 158 is formed at the approximate midpoint of bottom wall 147.

Figure 11:
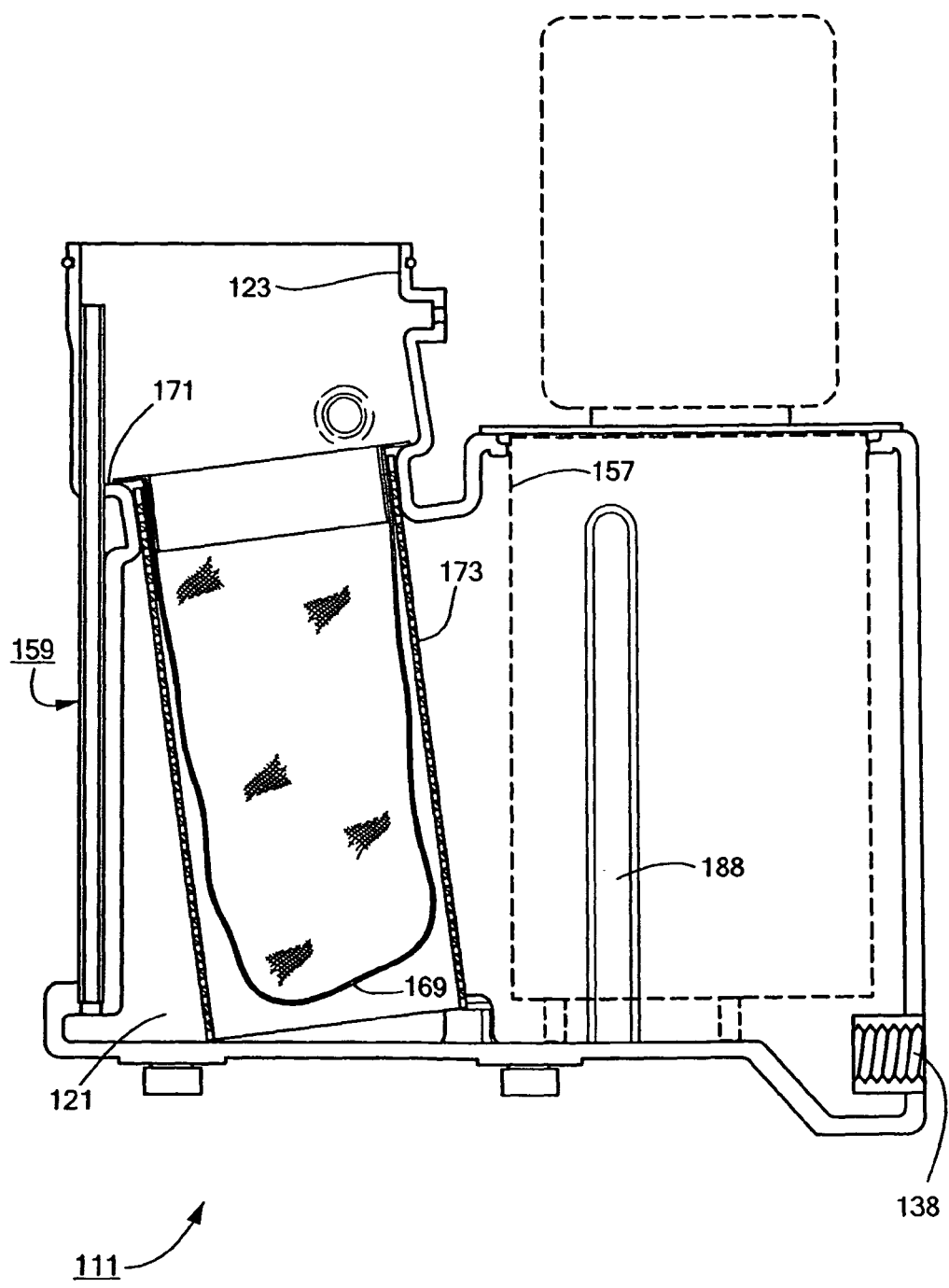
FIG. 11 is a longitudinal section view of the tank shown in FIG. 3 with the well removed and an immersion pump mounted therein and shown in dashed lines.
Figure 12:
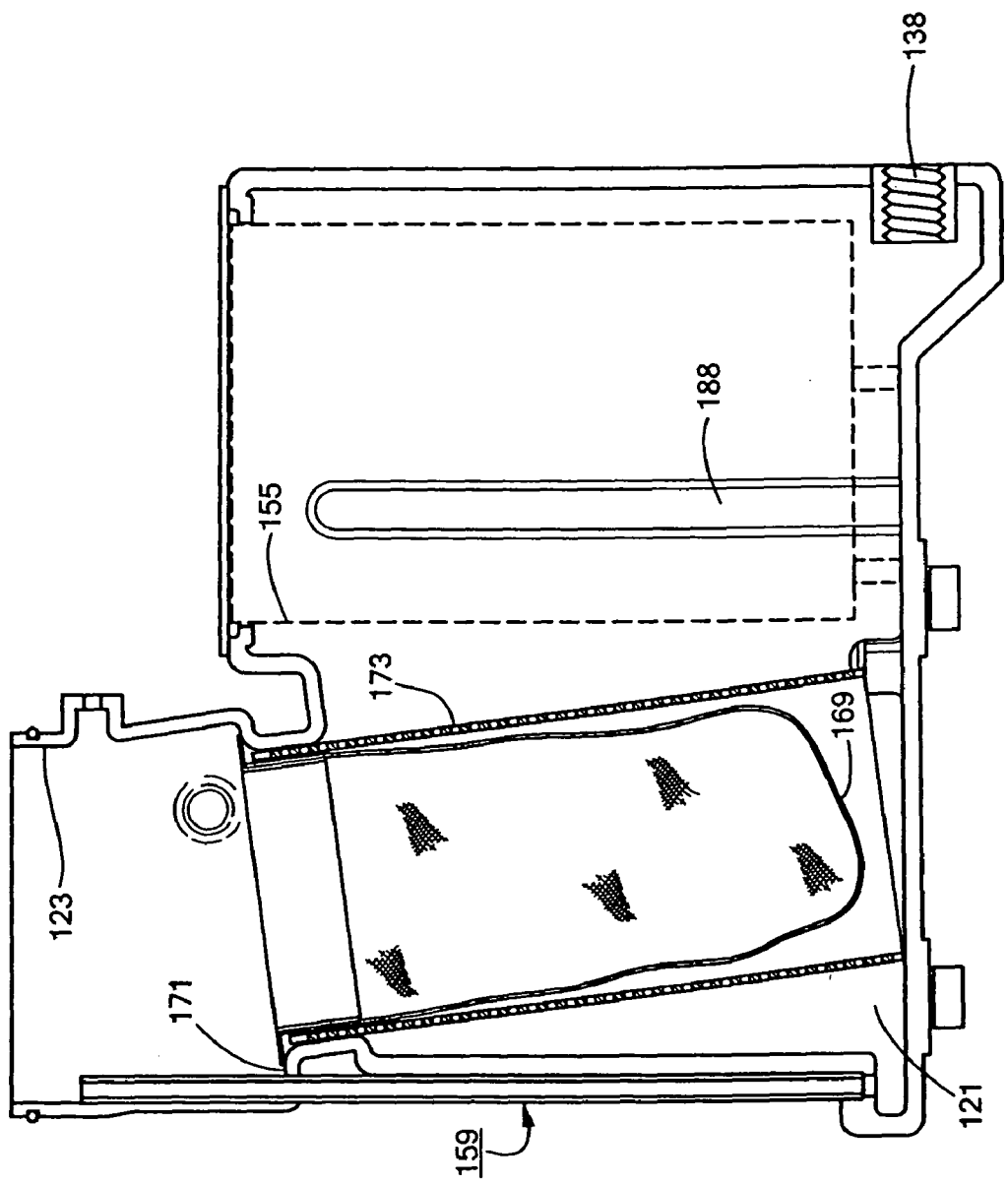
FIG. 12 is a longitudinal section view of the tank shown in FIG. 3 with the well removed and a heater mounted therein and shown in dashed lines.
Figure 13:
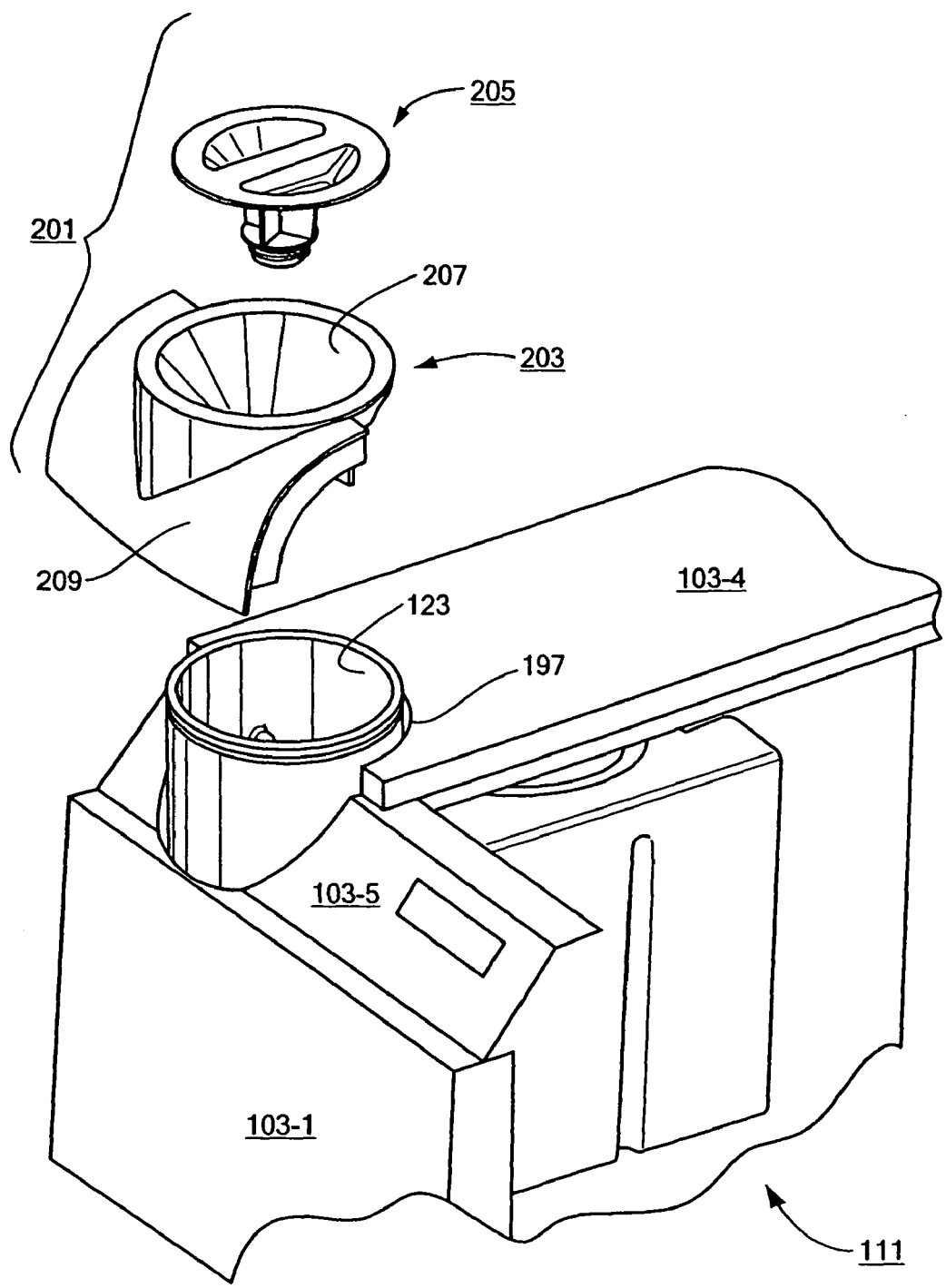
FIG. 13 is a fragmentary perspective view, partially exploded, of the system shown in FIG. 2.

It is to be understood that when either a heater 155 or an immersion pump 157 is desired for use in system 101 in conjunction with tank 111, well 143 is removed (preferably by cutting it out using a router), thereby enabling either device to be placed directly into the liquid retained within chamber 121 through opening 141, as seen most clearly in FIGS. 11 and 12. In order to retain the heater or immersion pump in place, a plurality of screws 142-1 (shown in FIG. 4) are driven through the device and, in turn, into engagement with threaded mounting holes 142-2 (shown in FIG. 3) which are formed in top wall 115.

In this manner, it is to be understood that tank 111 is universally constructed to receive either a deionizer cartridge 153, a heater 155 or an immersion pump 157, this universal construction of tank 111 serving as one of the principal novel features of the present invention. In addition, if desired, well 143 can be removed and no additional devices mounted inside the chamber.

Figure 1:
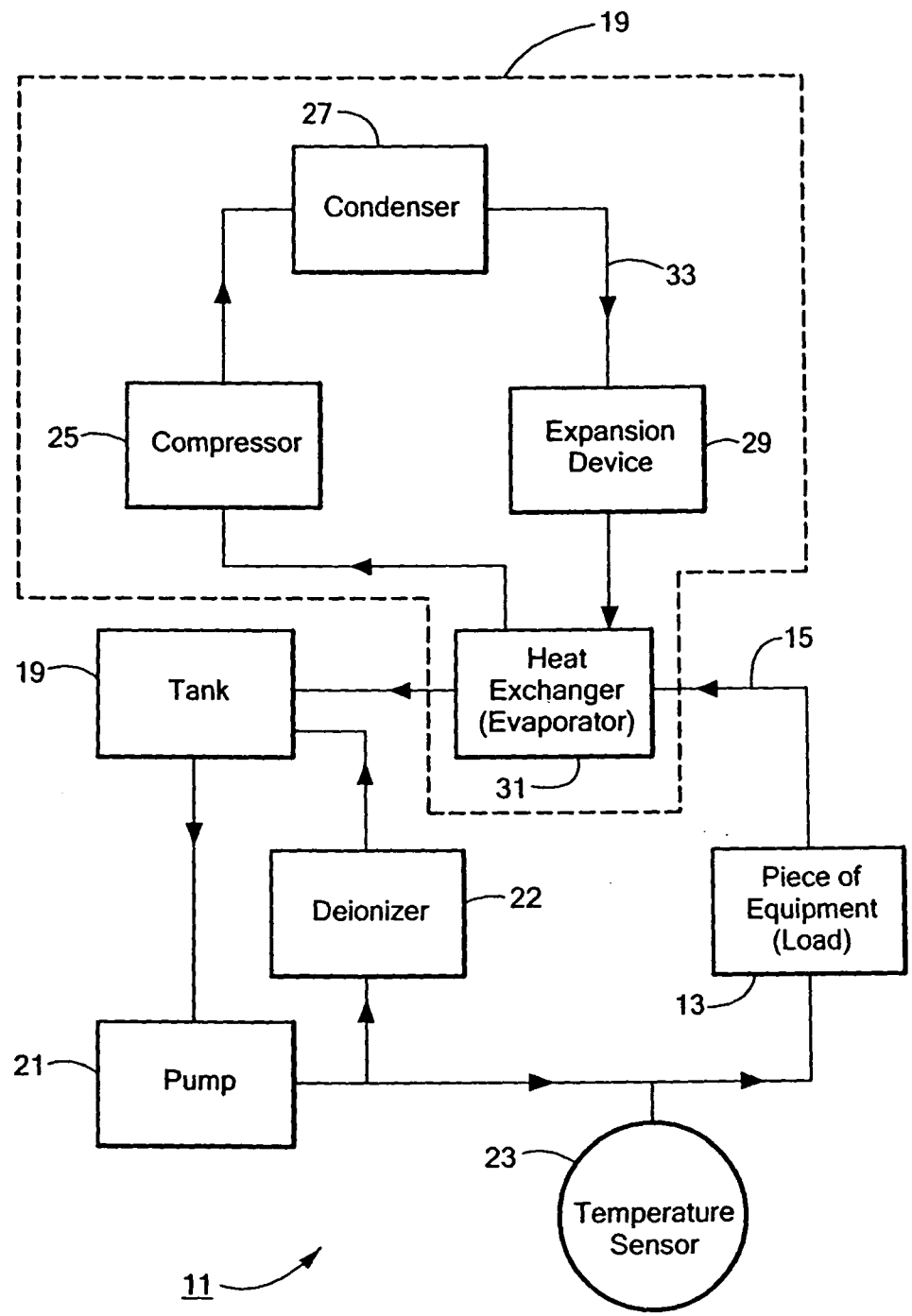
FIG. 1 is a block diagram of a prior art chiller coupled to a piece of equipment whose temperature is to be controlled by the chiller.

It should be noted that when immersion pump 157 is used in system 101, a conventional pump, such as pump 21 in FIG. 1, is not used.

Sight Gauge

Figure 7:
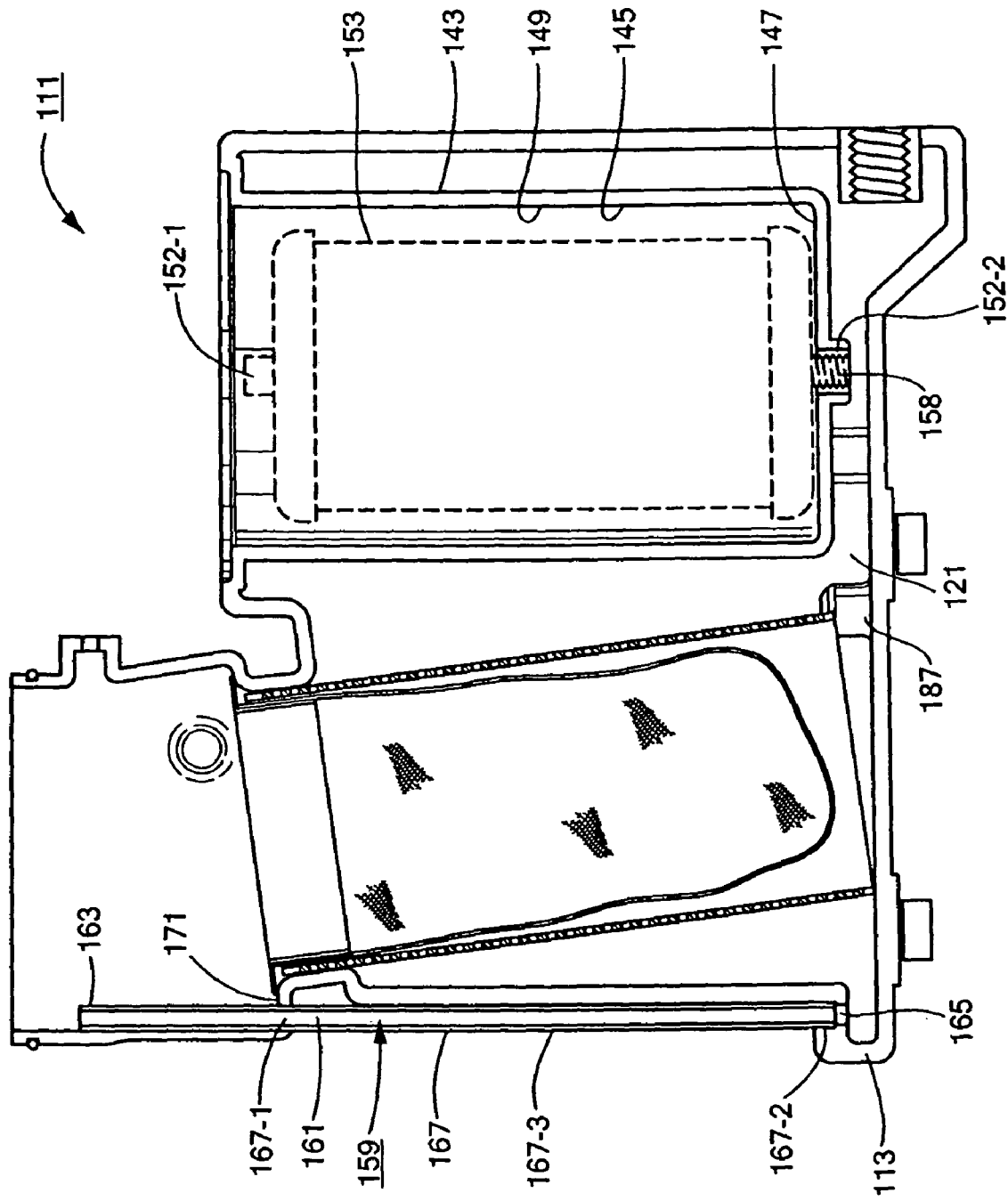
FIG. 7 is a section view of the tank shown in FIG. 7 taken along lines 7-7 in FIG. 6 with a deionizer mounted in the well and shown in dashed lines.

As can be seen, especially in FIGS. 3, 5 and 7, tank 111 is additionally provided with a sight gauge 159 for providing a visual indication of the level of the thermally controllable liquid retained within chamber 121.

Sight gauge 159 comprises a hollow transparent tube 161 with a ball 162 disposed therein. As can be appreciated, the location of the ball within tube 161 adjusts (i.e., raises or lowers) based on the level of the liquid within interior chamber 121. In this manner, the position of the ball provides a visual indicator as to level of the liquid in chamber 121.

Tube 161 comprises an open upper end 163, an open lower end 165 and an elongated intermediate portion 167 which connects upper end 163 to lower end 165.

As seen most clearly in FIG. 7, upper end 163 of tube 161 is located within the manual fill port 127 defined by collar 123. Similarly, lower end 165 is located within interior chamber 121 proximate bottom wall 117 of plastic body of material 113.

Intermediate portion 167 of tube 161 comprises an upper section 167-1, a portion of which is embedded within sidewall 118 of plastic body of material 113. Intermediate portion 167 of tube 161 also includes a lower section 167-2, a portion of which is similarly embedded within sidewall 118 of plastic body of material 113. Intermediate portion 167 of tube 161 further includes a middle section 167-3 which is disposed vertically adjacent the exterior surface of sidewall 118 (i.e., to provide an externally viewable means for reading the liquid level in sight gauge 159).

As noted above, at least a portion of sight gauge 159 is embedded in plastic body of 113. Specifically, during its molding process, plastic body of material 113 is heated to approximately 10° C. to 20° C. below its melting point. At that time, sight gauge 159 is disposed through sidewall 118 in the manner as described above. Accordingly, as body of material 113 cools and solidifies, a portion of sight gauge 159 remains permanently embedded within plastic body of material 113.

It is to be understood that the above-described process of embedding at least a portion of sight gauge 159 into body of material 113 eliminates the need for the types of fittings that are conventionally used in mounting a sight gauge onto a liquid retention tank. Furthermore, because the present invention does not utilize fittings to mount sight gauge 159 onto body of material 113, tank 111 is rendered less susceptible to leaking. As such, the concept of partially embedding sight gauge 159 into body of material 113 serves as one of the principal novel features of the present invention.

Sight gauge 159 can be seen through a window 160 in plate 103-1.

Input filter

Referring now to FIG. 7, tank 111 additionally includes a single filter 169 which is removably disposed within body of material 113 at a location immediately below the bottom (i.e. outlet) end of manual fill port 123. As can be appreciated, since filter 169 is immediately below the bottom of fill port 123 and since fluid entering auto-refill port 129 and return fluid port 137 also passes through fill port 123, filter 169 effectively filters fluid entering chamber 121 from any and all of those three input ports.

In the present embodiment, filter 169 is represented as being a bag filter (also referred to sometimes as a filter bag). However, it is to be understood that filter 169 is not limited to having a bag filter shaped configuration. Rather, filter 169 could be constructed in alternative configurations (e.g., in a planar configuration) without departing from the spirit of the present invention. Examples of bag filters may be found in U.S. Pat. Nos. 3,959,137 and 6,136,192.

Figure 10:
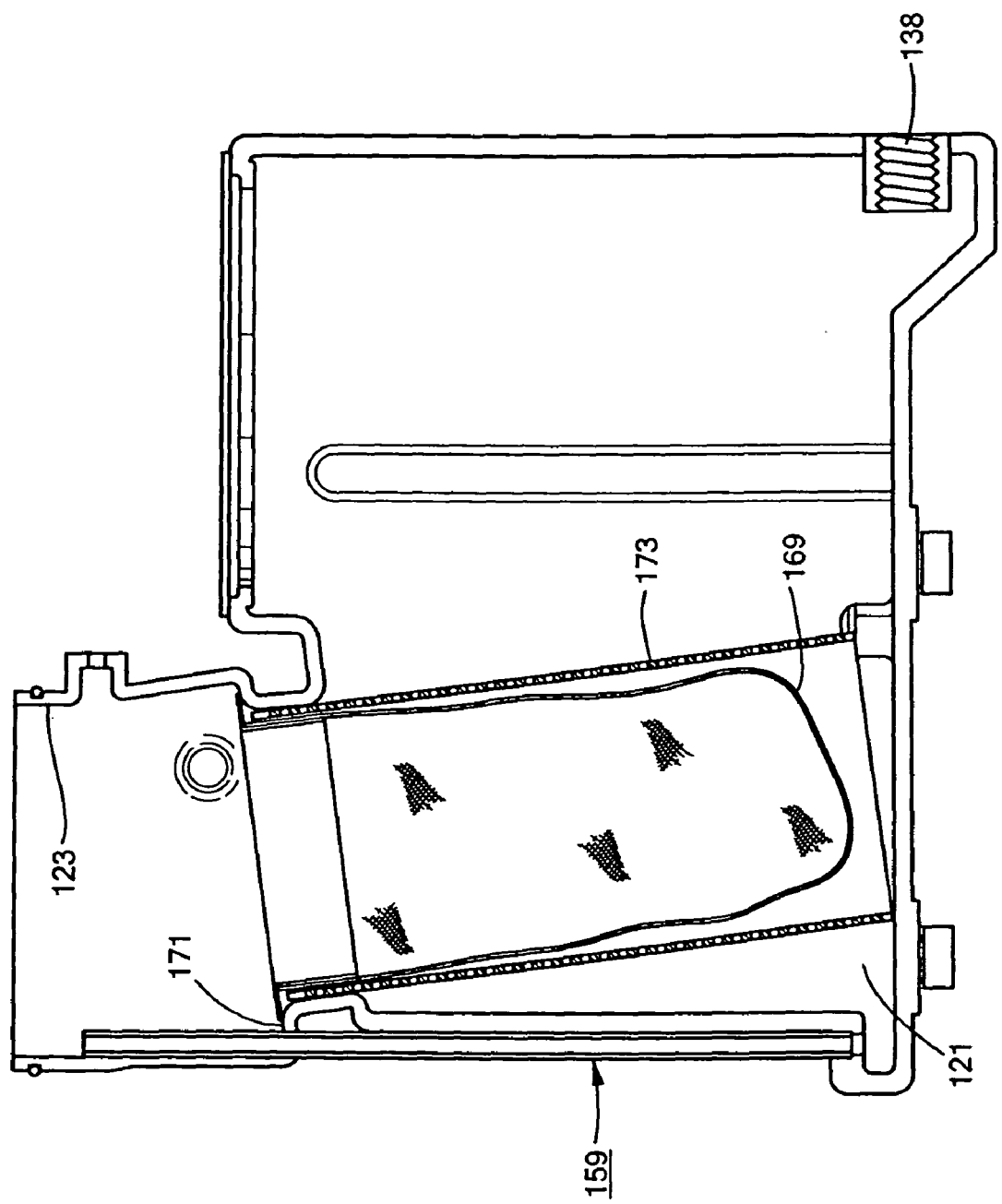
FIG. 10 is a section view of the tank shown in FIG. 6 taken along lines 10-10 in FIG. 6 with the well removed.

As seen most clearly in FIGS. 7 and 10, the inner surface of neck 125 of fill port 123 creates an annular shelf 171, the bottom of which serves as the recommended maximum fill level of liquid within tank 111. A cylindrical inner sleeve 173 constructed of a rigid material (e.g., a metal screen) is disposed within chamber 121, between inner surface of neck 125 and filter 169, the flange 175 at the top of filter 169 resting directly upon shelf 171. It should be noted that the orientation of shelf 171 disposes inner sleeve 173 at an angle (i.e., such that its bottom end is directed toward discharge port 138).

Filter 169 comprises a mesh bag 175 having an enclosed bottom end 177 and an open top end 179. A rigid annular plastic ring 181 is mounted on the open top end 179 of bag 175 and is sized and shaped to rest directly on top of flange 175 of inner sleeve 173.

In this manner, bag 175 of filter 169 is located entirely within cylindrical sleeve 173. As a consequence, inner sleeve 173 serves as a protective buffer between bag 175 and any mechanical device which may be in chamber 121 through opening 141 (e.g., a heater), which is highly desirable.

It is to be understood that by placing removable filter 169 immediately below the bottom of manual fill port 123, any/all contaminants present in liquid entering chamber 121 from fill port 123 are retained within bag 175. As a result, any device that is inserted into chamber 121 through opening 141 (e.g., a heater) is not exposed to said contaminants, which is highly desirable. As such, the concept of providing a single filter immediately downstream of all input ports for a liquid retention tank serves as a principal novel feature of the present invention.

Flow Velocity Reducer

Figure 8:
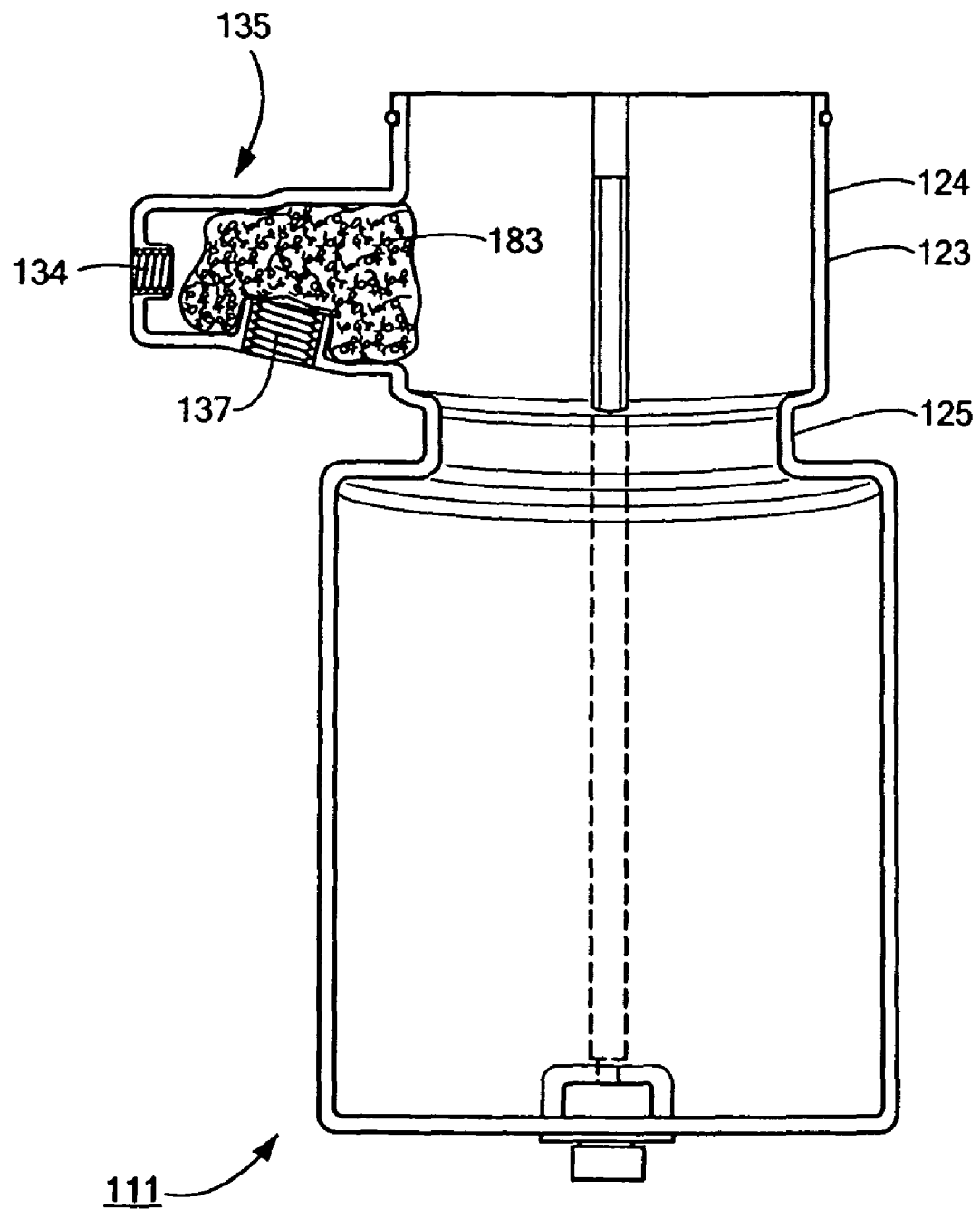
FIG. 8 is a section view of the tank shown in FIG. 7 taken along lines 8-8 in FIG. 6.

Referring now to FIG. 8, tank 111 is additionally provided with a flow velocity reducer 183 for reducing the velocity of the liquid entering chamber 121 through return port 137 (and also from auxiliary port 129.)

Flow velocity reducer 183 is a porous medium that is preferably constructed out of a stainless steel mesh so as to render it less susceptible to corrosion. As can be seen, flow regulator 183 is disposed within the majority of widened portion 133 of snout 129.

It should be noted that, without flow velocity reducer 183, liquid which enters through return port 137 would travel at a relatively high velocity. Accordingly, the liquid would possibly bounce off the top inner surface of snout 129. As a result, it has been found that, without flow velocity reducer 183, liquid which is input through return port 137 would splash and/or spray in an uncontrolled manner (i.e., in random directions) on entering fill port 123. Because the sprayed liquid may enter through the open upper end 163 of sight gage 159 or, in fact, may even exit tank 111 through manual fill port 127, the design of tank 111 would be unsatisfactory. Furthermore, if the liquid entering through return port 137 is warm, the liquid may stick to and/or melt the inner surface of snout 129, which is highly undesirable or even pose a safety problem if manual fill port 127 is uncovered.

Consequently, flow velocity reducer 183 serves to control the input of liquid through return port 137. Specifically, the liquid which enters through return port 137 passes through flow velocity reducer 183 which, in turn, divides the flow of liquid between the numerous channels defined in its porous medium. As a result, the liquid collects within flow regulator 183 and, over time, eventually trickles out therefrom and into chamber 121. In this manner, liquid input through return port 137 is directed into chamber 121 in a controlled manner, which is highly desirable. As such, the concept of providing a flow regulator 183 for controlling the input of liquid through return port 137 serves as a principal novel feature of the present invention.

Additional Design Features of Housing

As seen most clearly in FIGS. 3 and 4, a vent hole 185 is provided in collar 123. As a result, the manual fill port 127 is always maintained at atmospheric pressure, which is desirable. Without vent hole 185, manual fill port 127 would pressurize slightly which, in turn, would render the sight gage 159 less accurate.

In addition, a threaded fitting 186 is provided in collar 123 around vent hole 185. Fitting 186 enables a venting check valve (not shown) to be connected to housing 113, the venting check valve being particularly useful in those situations where a volatile liquid is stored in tank 111.

As seen most clearly in FIGS. 5 and 7, a plurality of projections 187 is formed on bottom wall 117 of housing 113 and protrudes up into interior chamber 121. In addition, a plurality of vertical indentations 188 is formed into sidewall 119 and serve as strengthening ribs. It should be noted that projections 187 cooperate with shelf 171 to retain filter 169 and sleeve 173 in place. In this manner, filter 169 and sleeve 173 are kept adequately spaced away from a heater that may be disposed into chamber 121 through opening 141.

A pair of feet 189 is formed on the outer surface of bottom wall 117 and extends slightly down therefrom. As can be appreciated, feet 189 are used to mount tank 111 within system 101. Furthermore, a plurality of lateral strips 191 is formed on the outer surface of bottom wall 117 and provide pivot points through which housing 113 may flex in order to mount feet 189 in place within system 101 (i.e., rendering tank 111 easier to install within system 101). A temperature sensor (not shown) may be mounted inside chamber 121 through opening 190. Opening 190 may be covered with a plate 192 which is sealed shut by screws 193.

Fill Port Cover Assembly

Figure 14:
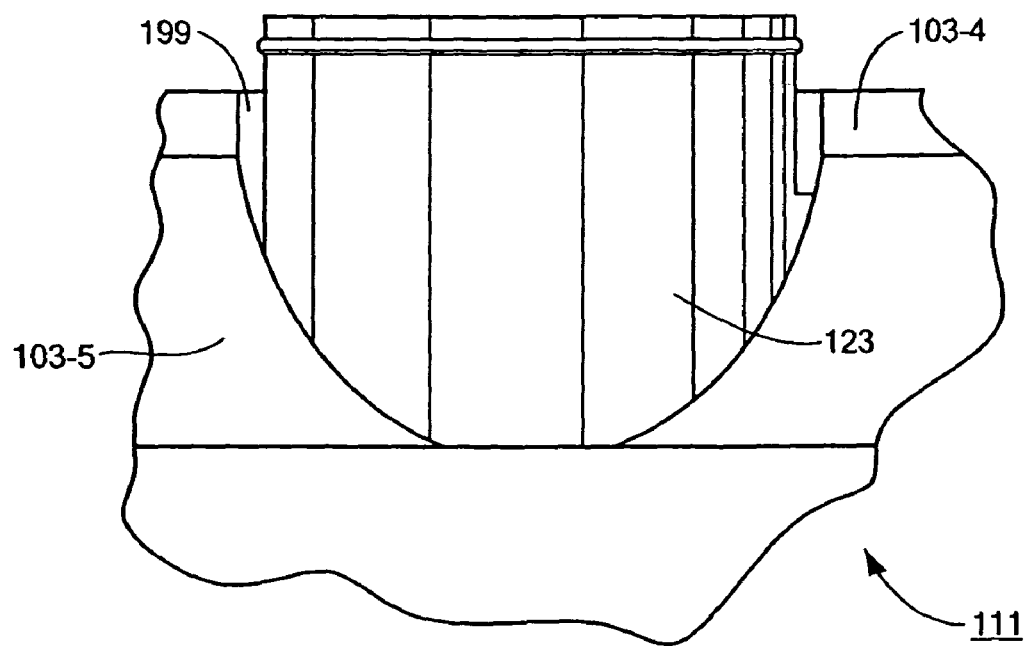
FIG. 14 is a fragmentary side section view of the top of the system shown in FIG. 2.
Figure 15:
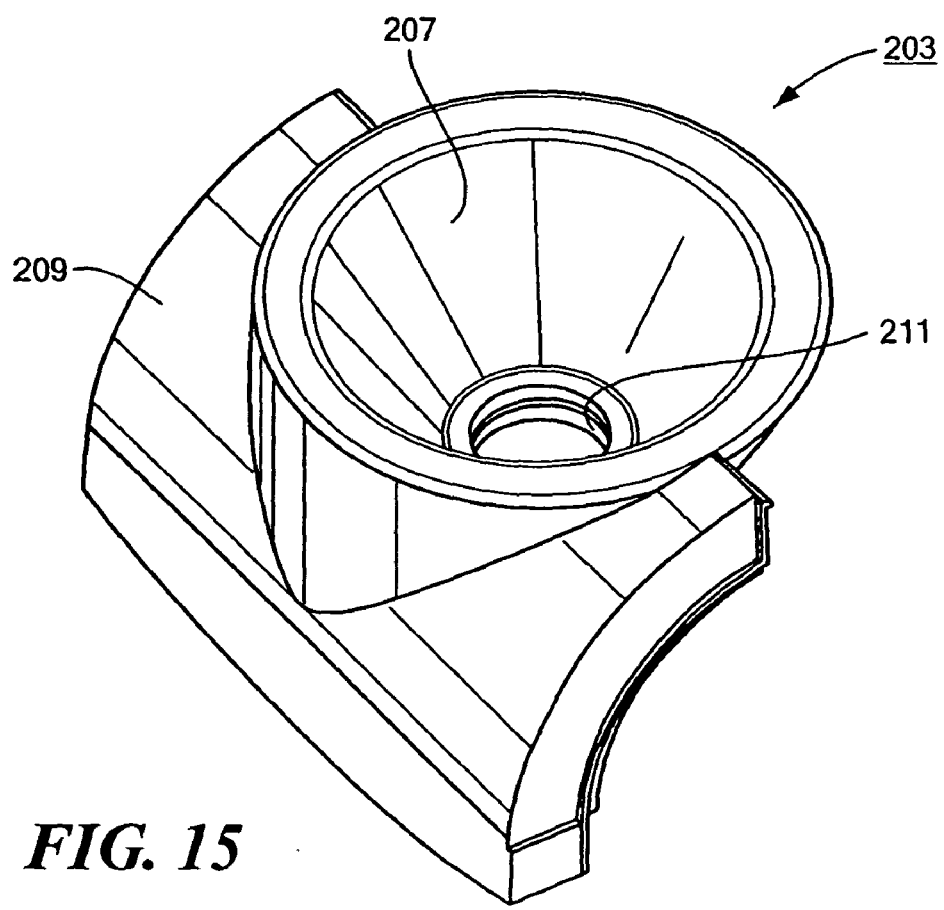
FIG. 15 is an enlarged perspective view of the funnel shaped cover member shown in FIG. 11.
Figure 16:
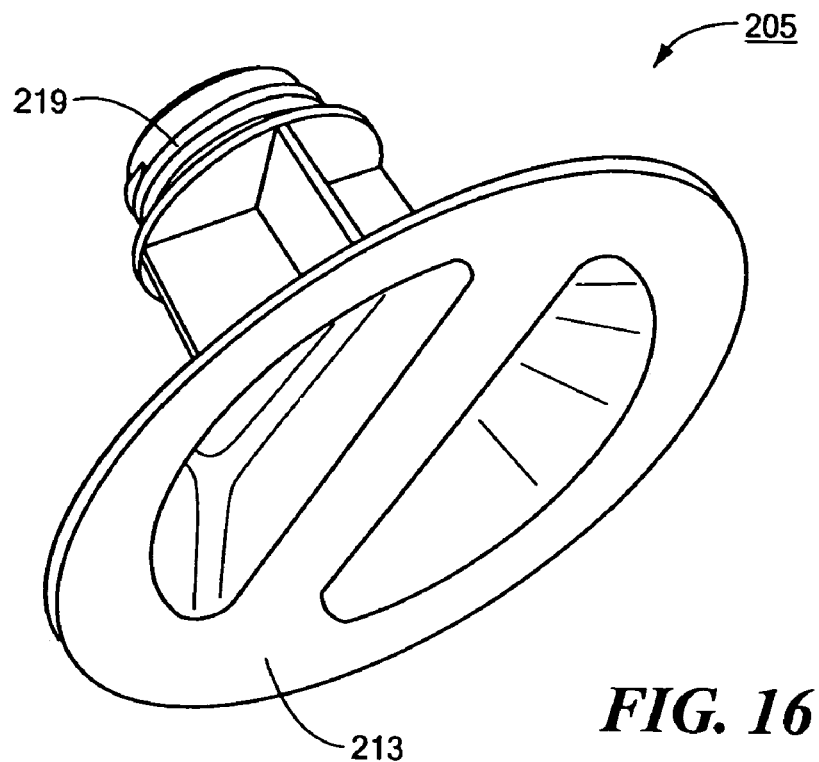
FIGS. 16 and 17 are perspective views taken from the top and bottom, respectively, of the cap shown in FIG. 11.
Figure 17:
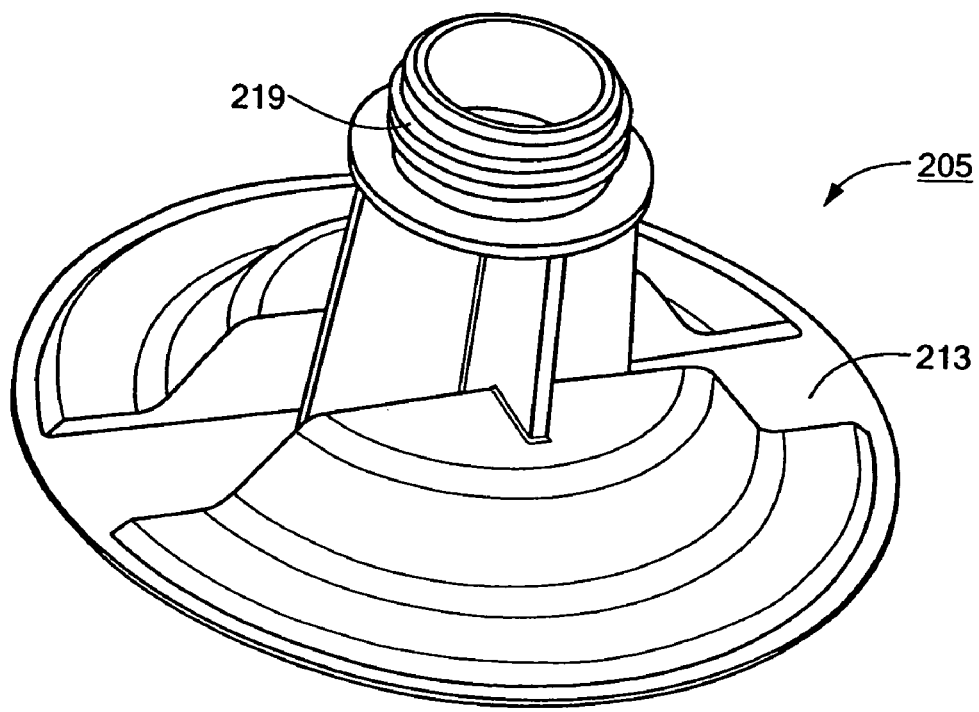
Figure 18:
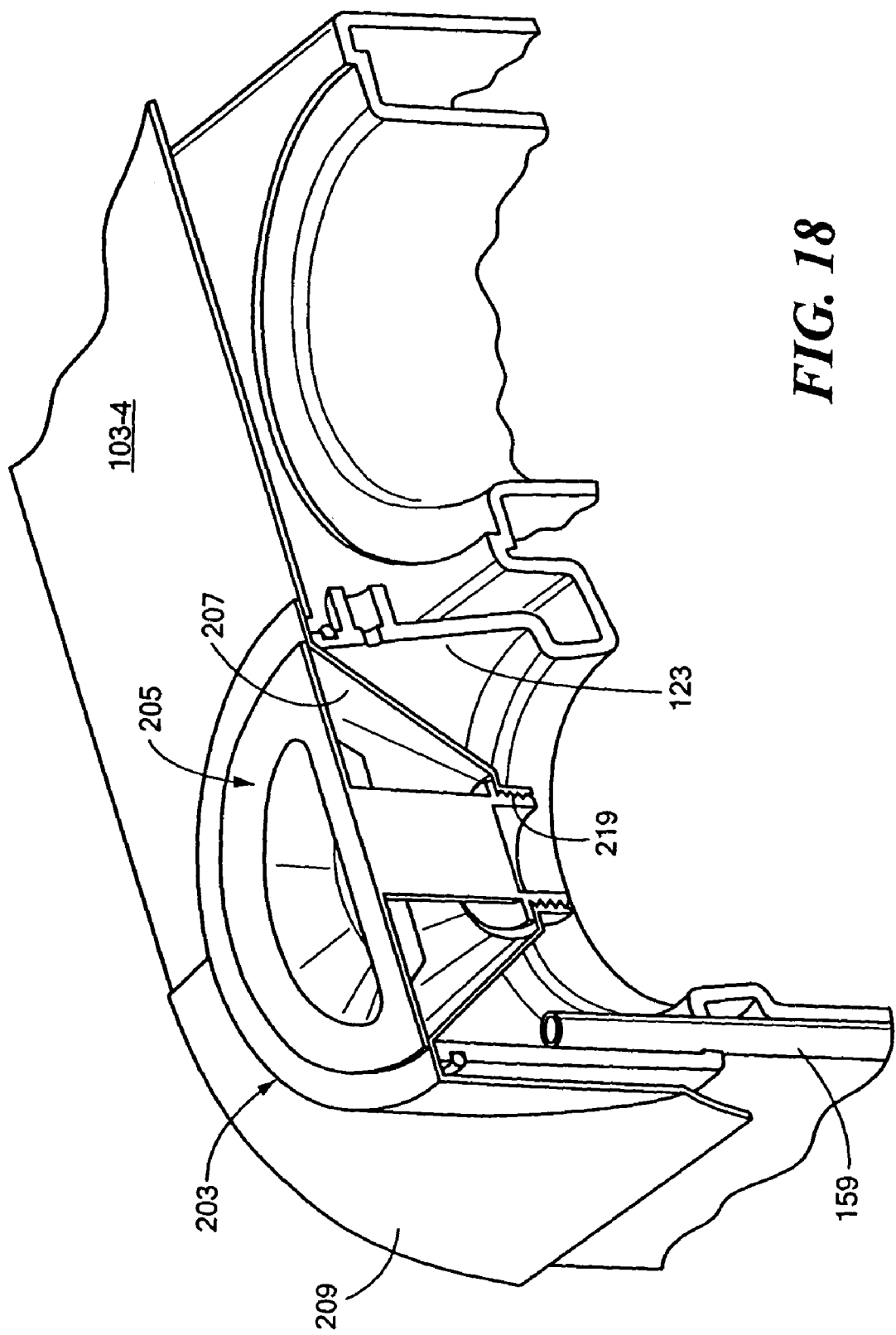
FIG. 18 is a fragmentary perspective view showing how the cover assembly is seated in the housing of the system.
Figure 19:
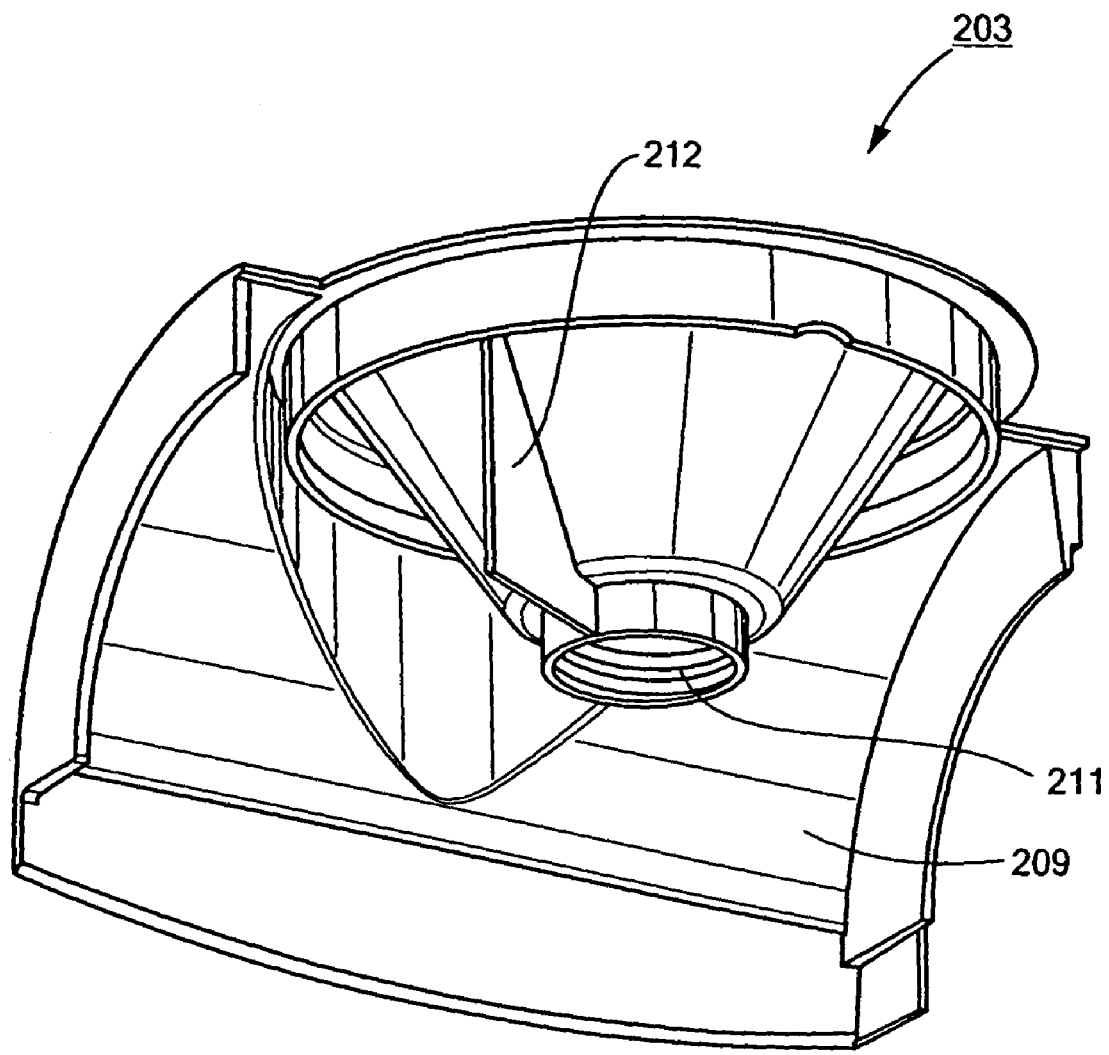
FIG. 19 is a perspective view taken from the rear of the cover shown in FIG. 15.

Referring now to FIGS. 13 through 17, there is shown in FIG. 14 an enlarged, fragmentary, partially exploded view of system 101. As noted before, system 101 includes a housing 103 having a plurality of panels 103-1 through 103-4. A circular opening 197 is formed in housing 103 through which a portion of annular collar 124 of fill port 123 protrudes.

It should be noted that a significant gap, or space, 199 is created between housing panels 103-4 and 103-5 and fill port 123. As can be appreciated, gap 199 serves as an opening through which moisture and/or contaminants may enter into housing 103, thereby rendering the various components retained within shell 193 susceptible to damage, which is highly undesirable.

Accordingly, system 101 includes a cover assembly 201 which serves the following three functions: (i) facilitating the process of manually pouring liquid through fill port 123, (ii) covering gap 199, and (iii) enclosing manual fill port 123 when liquid is not being poured into tank 111.

Cover assembly 201 comprises a cover 203 and a removable sealing cap (i.e. plug) 205.

Cover 203 is a unitary plastic member which includes a conical funnel 207 and an arcuate plate 209, funnel 207 being shaped to define at its lower (apex) end a small circular threaded opening 211. As seen most clearly in FIG. 14, cover 203 is designed to be removably mounted on collar 123 of tank 111, with funnel 207 being sized and shaped to project down through manual fill port 127 and with plate 209 covering gap 199. In this manner, it is to be understood that liquid can be manually poured into chamber 121 of tank 111 through opening 211 in funnel 207. As such, funnel 207 serves to direct the liquid into chamber 121 in a controlled manner and spaced adequately away from open upper end 163 of sight gage 159. Cover 203 also includes a rib 212 which is positioned in front of snout 129 when cover 203 is mounted on fill port 127 and serves to prevent porous medium 212 from being pushed into fill port 123 by fluid flowing in auxiliary port 129.

When liquid is not being deposited into tank 111 through manual fill port 127, it is desirable to enclose opening 211 in funnel 207 to (i) protect liquid retained in tank 111 from outside contaminants and (ii) to protect people who may otherwise touch the thermally regulated liquid retained in tank 111. Accordingly, plug 205 removably mounts on cover 203 to enclose opening 211.

Plug 205 is a unitary plastic member that includes a base 213 and a stem 215 orthogonally extending therefrom. Base 213 is generally disc-shaped and includes a pair of opposing recesses in its top surface which together define a handle 217. Stem 215 extends down from the approximate midpoint of base 213 and terminates at its free end into an externally threaded projection 219 which is sized and shaped to mate with internally threaded opening 211.

Plug 205 serves three purposes as follows:
(1) when plug 205 is screwed onto opening 211 it closes off opening 211 so that one cannot access chamber 121 or introduce unwanted matter into chamber 121.
(2) with plug 205 screwed onto opening 211, cover assembly 211 can be easily removed from tank 111 for any reason, such as to replace filter 169, by simply grasping plug 205 and lifting up cover assembly 201.
(3) with plug 205 removed from cover 203, liquid can easily be poured into fill port 123 through funnel 207.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A tank for use in a system that outputs a liquid at a user defined constant temperature, said tank comprising:
  (a) a body of material sized and shaped to define a chamber for receiving and storing a supply of the liquid, the chamber having a bottom wall, a top wall and at least one sidewall, the body of material additionally including,
    (i) a fill port extending upward from the top wall of the body of material, the fill port serving as a first port for inputting liquid into the chamber, the fill port including a collar portion,
    (ii) a snout-shaped auxiliary port extending out from the collar portion of the fill port, the auxiliary port serving as a second port for inputting liquid into the chamber, the auxiliary port including an inlet portion and an outlet portion, the outlet portion connecting the inlet portion to the collar portion of the fill port,
    (iii) an outlet port for discharging liquid from the chamber, and
    (iv) a return liquid formed on the auxiliary port, the return port serving as a third port for inputting liquid into the chamber, and
  (b) a flow velocity reducer disposed directly within the interior of the outlet portion of the snout-shaped auxiliary port, the flow velocity reducer lowering the velocity of liquid entering the chamber from the return liquid port, the flow velocity reducer being a body of porous material.

2. A tank for use in a system that outputs a liquid at a user defined constant temperature, said tank comprising:
  (a) a body of material having a plurality of walls which together define a chamber for receiving and storing a supply of the liquid, the chamber having
    (i) a fill port for pouring new liquid into the chamber, the fill port including a collar portion,
    (ii) a snout-shaped auxiliary port extending out from the collar portion of the fill port for adding liquid into the chamber, the auxiliary port including an inlet portion and an outlet portion, the outlet portion connecting the inlet portion to the collar portion,
    (iii) an outlet port for discharging liquid from the chamber, and
    (iv) a return liquid port for returning liquid back into the chamber previously discharged through the outlet port, and
  (b) a flow velocity reducer for lowering the velocity of the liquid entering the chamber from the return liquid port, the flow velocity being a body of porous material disposed directly within the interior of the outlet portion of the snout-shaped auxiliary port.

* * * * *